(12) United States Patent
Lee et al.

(10) Patent No.: US 9,792,058 B2
(45) Date of Patent: Oct. 17, 2017

(54) SYSTEM AND METHOD OF SELECTING SOURCE AND DESTINATION BLOCKS FOR WEAR-LEVELING

(71) Applicant: SK hynix Inc., Gyeonggi-do (KR)

(72) Inventors: Jong-Min Lee, Gyeonggi-do (KR); Jin-Woong Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 37 days.

(21) Appl. No.: 14/959,861

(22) Filed: Dec. 4, 2015

(65) Prior Publication Data

US 2017/0017418 A1    Jan. 19, 2017

(30) Foreign Application Priority Data

Jul. 15, 2015   (KR) .................. 10-2015-0100240

(51) Int. Cl.
*G06F 3/06* (2006.01)
*G06F 12/02* (2006.01)

(52) U.S. Cl.
CPC ............ *G06F 3/0619* (2013.01); *G06F 3/065* (2013.01); *G06F 3/068* (2013.01); *G06F 3/0652* (2013.01); *G06F 12/0238* (2013.01); *G06F 2212/7211* (2013.01)

(58) Field of Classification Search
CPC ............ G06F 3/0619; G06F 12/0238; G06F 2212/7211
USPC .......................................... 711/103
See application file for complete search history.

(56) References Cited

U.S. PATENT DOCUMENTS

| 2006/0288153 | A1* | 12/2006 | Tanaka | G06F 12/0246 711/103 |
| 2010/0115186 | A1* | 5/2010 | Chang | G06F 12/0246 711/103 |
| 2012/0191927 | A1* | 7/2012 | Gorobets | G06F 12/0246 711/156 |
| 2013/0311703 | A1* | 11/2013 | Cheng | G06F 12/0246 711/103 |

(Continued)

FOREIGN PATENT DOCUMENTS

| KR | 1020130061967 | 6/2013 |
| KR | 101413736 | 7/2014 |

(Continued)

*Primary Examiner* — Than Nguyen
(74) *Attorney, Agent, or Firm* — IP & T Group LLP

(57) ABSTRACT

A memory system includes a memory device, having a plurality of memory blocks, for storing data and a controller for performing a wear-leveling operation between source and target memory blocks selected from the memory blocks. The controller selects the source and target memory blocks based on an erase count list storing current erase count (EC) information of the memory blocks, selects one having the greatest EC as the source memory block from the erase count list, selects the target memory block from remaining ones among the memory blocks other than both of the source memory block and an immediately previous target memory block of an immediately previous wear-leveling operation, and identifies the immediately previous target memory block of the immediately previous wear-leveling operation through a swap list including swap information of the memory blocks and information on the source and target memory blocks.

14 Claims, 11 Drawing Sheets

(56) References Cited

U.S. PATENT DOCUMENTS

2015/0261671 A1* 9/2015 Chu .................. G06F 12/0246
711/103

FOREIGN PATENT DOCUMENTS

| KR | 1020140096875 | 8/2014 |
| KR | 101437123 | 9/2014 |

* cited by examiner

SYSTEM AND METHOD OF SELECTING SOURCE AND DESTINATION BLOCKS FOR WEAR-LEVELING

CROSS-REFERENCE TO RELATED APPLICATIONS

The present application claims priority of Korean Patent Application No. 10-2015-0100240, filed on Jul. 15, 2015, which is incorporated herein by reference in its entirety.

BACKGROUND

1. Field

Exemplary embodiments of the present invention relate to a memory system, and more particularly, to a memory system and an operating method of a memory system.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. These portable electronic devices generally use a memory system having one or more semiconductor memory devices also referred to as data storage devices. The data storage device may be used as the main memory device or an auxiliary memory device of a portable electronic device.

Semiconductor memory devices provide excellent stability, durability, high information access speed, and low power consumption, since they have no moving parts. Examples of data storage devices include universal serial bus (USB) memory devices, memory cards having various interfaces, and solid state drives (SSD).

SUMMARY

Various embodiments are directed to a memory system capable of stably processing data by minimizing the complexity and performance reduction thereof and maximizing use efficiency of a memory device therein.

In an embodiment, a memory system may include: a memory device including a plurality of memory blocks, and suitable for storing data; and a controller suitable for performing a wear-leveling operation between source and target memory blocks selected from the memory blocks. The controller may select the source and target memory blocks based on an erase count list storing current erase count (EC) information of the memory blocks.

The controller may select one having the greatest EC as the source memory block from the erase count list. The controller may select the target memory block from a target memory block list storing information of remaining ones among the memory blocks other than the source memory block.

The controller may select the target memory block from remaining ones among the memory blocks other than both of the source memory block and an immediately previous target memory block of an immediately previous wear-leveling operation.

The controller may identify the immediately previous target memory block of the immediately previous wear-leveling operation through a swap list including swap information of the memory blocks and information on the source and target memory blocks.

The controller may select one in ascending order of the current EC from the smallest current EC as the target memory block from the target memory block list.

The controller may select one as the target memory block from the target memory block list by firstly selecting a group of memory blocks from the target memory block list through predetermined criteria and then selecting the one from the group of memory blocks.

The controller may select memory blocks each having the current EC less than an average EC of the entire current ECs included in the erase count list as the group of memory blocks.

The controller may select memory blocks each having the current EC less than a preset EC as the group of memory blocks.

The controller may select the target memory block from the group of memory blocks other than both of the source memory block and an immediately previous target memory block of an immediately previous wear-leveling operation.

The controller may select one in ascending order of the current EC from the smallest current EC as the target memory block from the group of memory blocks.

In an embodiment, there is provided an operating method of a memory system comprising a plurality of memory blocks. The operating method may include: selecting source and target memory blocks based on an erase count list storing current erase count (EC) information of the memory blocks; and performing a wear-leveling operation between the source and target memory blocks selected from the memory blocks.

The selecting of the source and target memory blocks may include: selecting one having the greatest EC as the source memory block from the erase count list; and selecting the target memory block from a target memory block list storing information of remaining ones among the memory blocks other than the source memory block.

The selecting of the target memory block may be performed by selecting the target memory block from remaining ones among the memory blocks other than both of the source memory block and an immediately previous target memory block of an immediately previous wear-leveling operation.

The selecting of the target memory block may identify the immediately previous target memory block of the immediately previous wear-leveling operation through a swap list including swap information of the memory blocks and information on the source and target memory blocks.

The selecting of the target memory block may be performed by selecting one in ascending order of the current EC from the smallest current EC as the target memory block from the target memory block list.

The selecting of the target memory block may be performed by selecting one as the target memory block from the target memory block list by firstly selecting a group of memory blocks from the target memory block list through predetermined criteria and then selecting the one from the group of memory blocks.

The selecting of the group of memory blocks may be performed by selecting memory blocks each having the current EC less than an average EC of the entire current ECs included in the erase count list as the group of memory blocks.

The selecting of the group of memory blocks may be performed by selecting memory blocks each having the current EC less than a preset EC as the group of memory blocks.

The selecting of the target memory block may be performed by selecting the target memory block from the group of memory blocks other than both of the source memory block and an immediately previous target memory block of an immediately previous wear-leveling operation.

The selecting of the target memory block may be performed by selecting one in ascending order of the current EC from the smallest current EC as the target memory block from the group of memory blocks.

DETAILED DESCRIPTION

Figure 1:
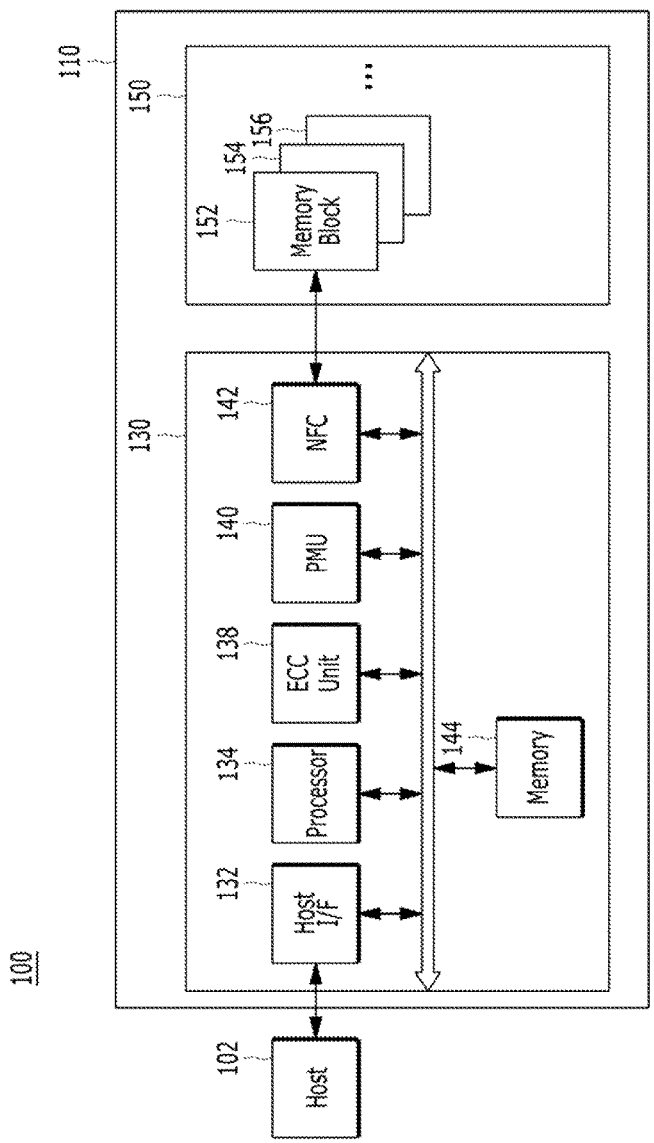
FIG. 1 is a diagram illustrating a data processing system including a memory system according to an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise for include) or have other elements as well as those elements if there is no specific limitation. The terms of singular form may include plural forms unless stated otherwise.

FIG. 1 is a block diagram illustrating a data processing system including a memory system according to an embodiment.

Referring to FIG. 1, a data processing system 100 may include a host 102 and a memory system 110.

The host 102 may include, for example, a portable electronic device such as a mobile phone, an MP3 player and a laptop computer or an electronic device such as a desktop computer, a game player, a TV, a projector and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM) an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device such as a solid state drive (SSD). When the memory system 110 is used as a SSD, the operation speed of the host 102 that is electrically coupled with the memory system 110 may be significantly increased.

The controller 130 and the memory device 150 may be integrated into one semiconductor device and be configured as a memory card. The controller 130 and the memory card 150 may be integrated into one semiconductor device and be configured as a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

The memory system 110 may be configured as part of a computer, an ultra-mobile PC (UMPC) a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted, for example, the memory device may store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. The memory device may have any other suitable structure.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (CSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
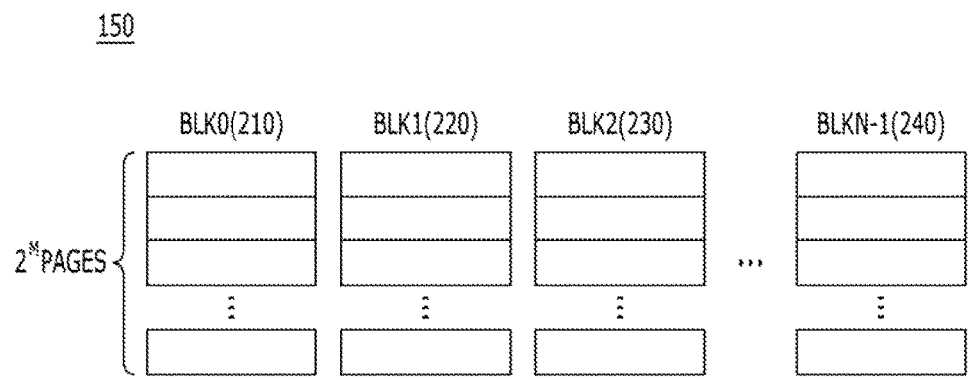
FIG. 2 is a diagram illustrating a memory device according to an embodiment of the present invention.

FIG. 2 is a schematic diagram illustrating the memory device 150 shown in FIG. 1.

Referring to FIG. 2, the memory device 150 may include a plurality of memory blocks, for example, zeroth to (N-1)$^{th}$ blocks 210 to 240. Each of the plurality of memory blocks 210 to 240 may include a plurality of pages, for example, $2^M$ number of pages ($2^M$ PAGES). Each of the plurality of pages may include a plurality of memory cells. A plurality of word lines may be electrically coupled to the memory cells.

The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
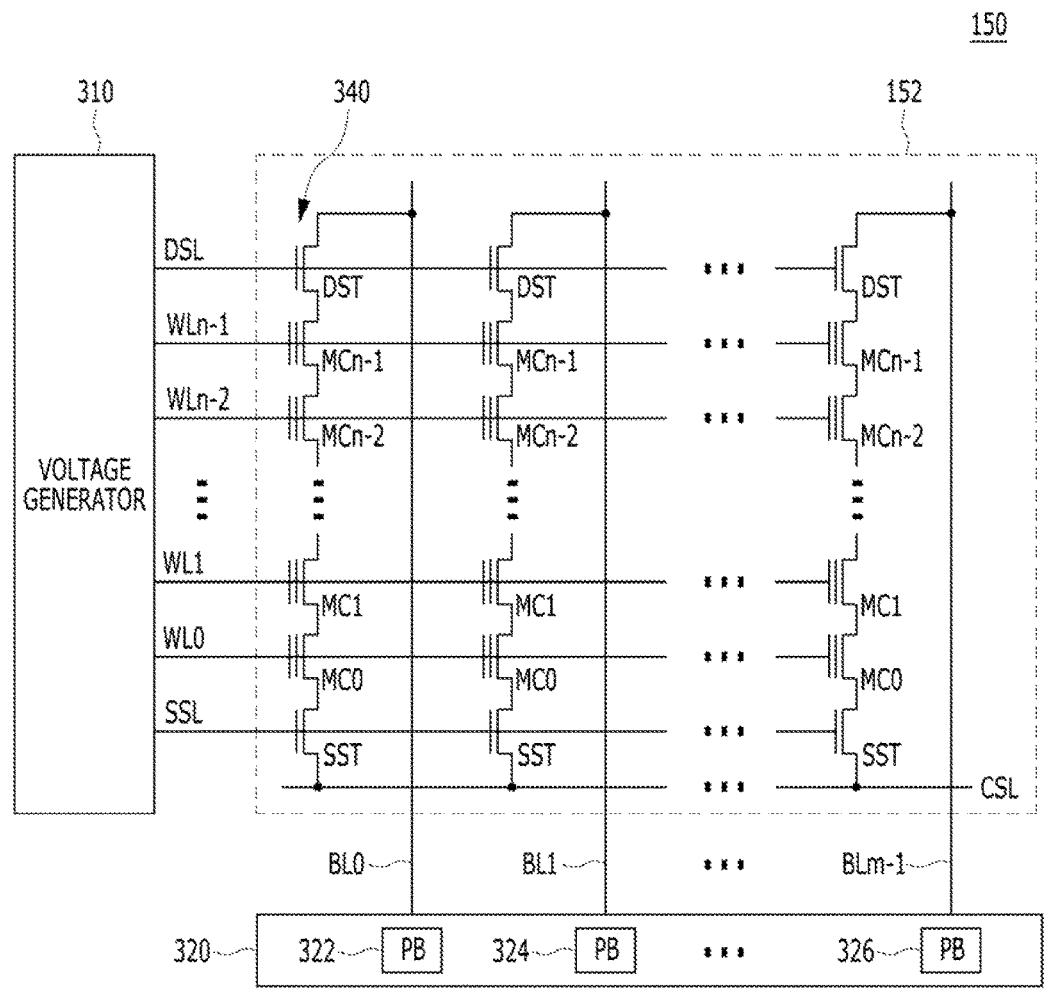
FIG. 3 is a circuit diagram illustrating a memory block in a in memory device according to an embodiment of the present invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. For example, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating various aspects of the memory device 150 shown in FIG. 1.

Figure 4:
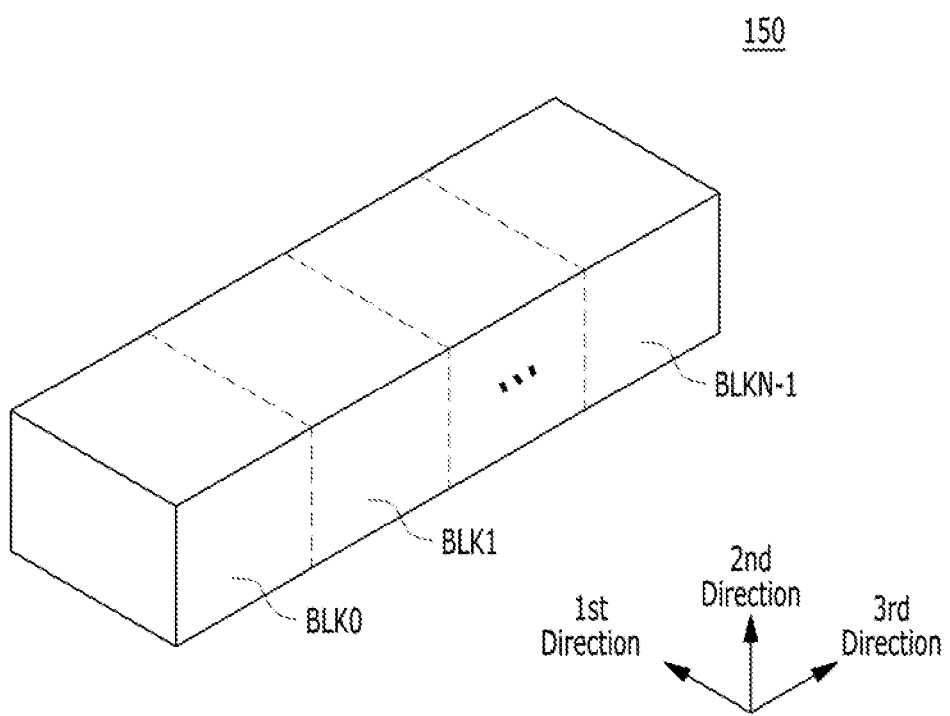
FIGS. 4 to 11 are diagrams schematically illustrating various aspects of the memory device shown in FIG. 2 according to an embodiment of the present invention.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. Each memory block BLK0 to BLKN-1 may include a structure which extends in first to third directions, for example, an x-axis direction, a y-axis direction and a z-axis direction.

The respective memory blocks BLK0 to BLKN-1 may include a plurality of NAND strings NS which extend in the second direction. The plurality of NAND strings NS may be provided in the first direction and/or the third directions. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN-1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
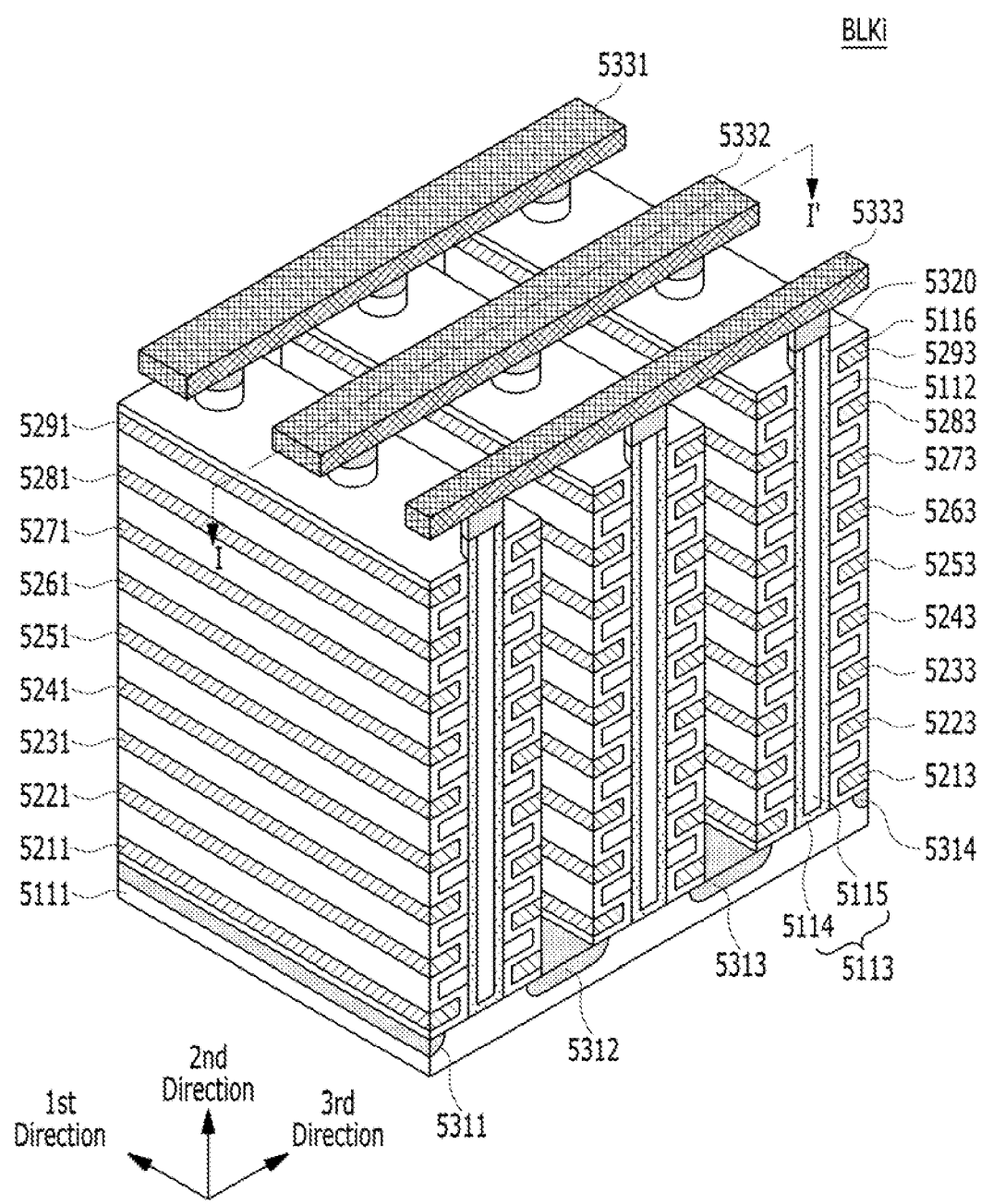
Figure 6:
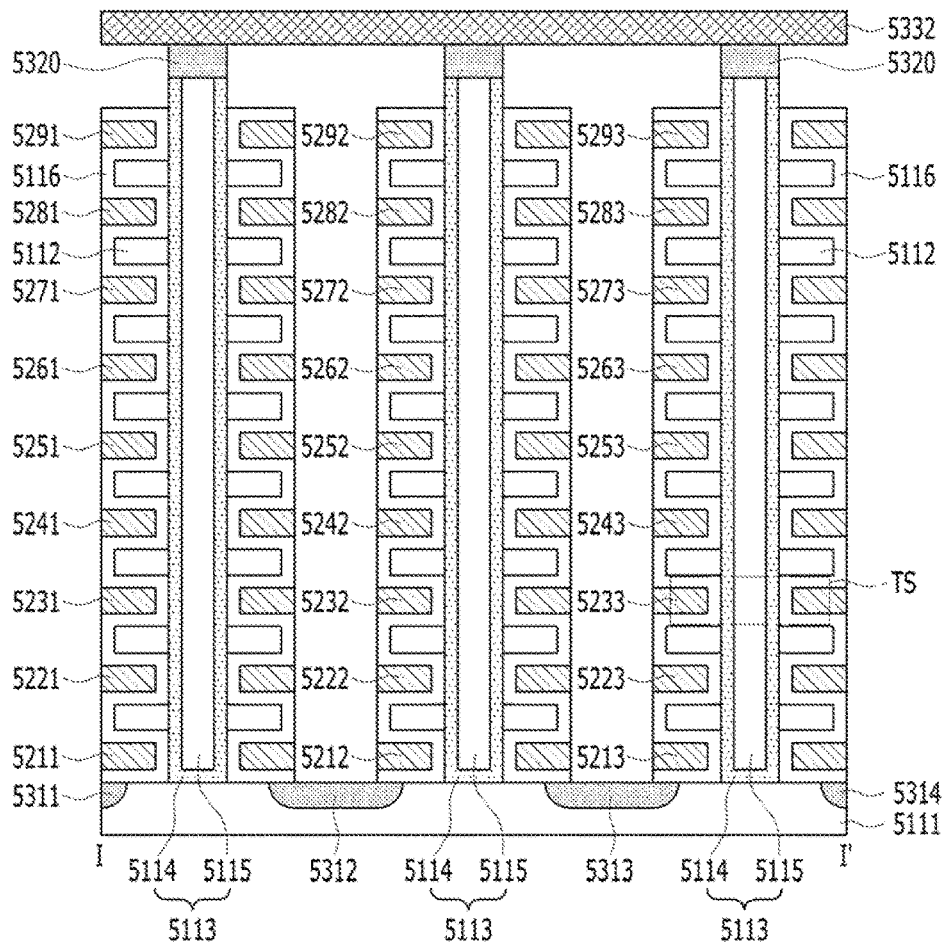

FIG. 5 is a perspective view of one BLKi of the memory blocks BLK0 to BLKN-1 shown in FIG. 4. FIG. 6 is a cross-sectional view taken along a line I-I' of the memory block BLKi shown in FIG. 5.

Referring to FIGS. 5 and 6, a memory block BLKi, among the plurality of memory blocks of the memory device 150, may include a structure which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. The substrate 5111 may be a p-type silicon, however, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the impurity used in the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide. It is to be noted that other suitable dielectric materials may also be used.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5115 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric material's 5112. The conductive material 5291 which extends in the first direction may be provided over the uppermost dielectric material 5112. The conductive materials 5211 to 5291 which extend in the first direction may be a metallic material. The conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. The width of each drain 5320 may be larger than the width of each corresponding pillar 5113. For example, each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. For example, the drains 5320 and the conductive materials 5331 to 5333 may be electrically coupled with through contact plugs. The conductive materials 5331 to 5333 may be a metallic material. The conductive materials 5331 to 5333 may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
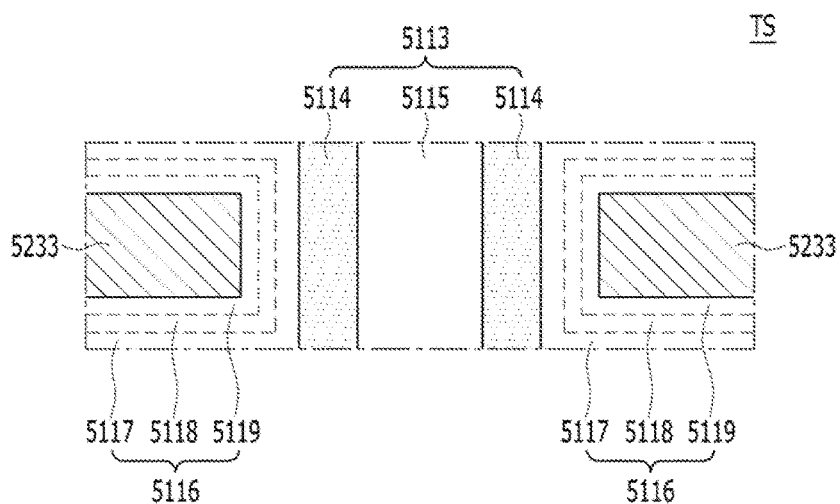

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment shown, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. For example, the gates or the control gates may extend in the first direction and form word lines and at least two select lines, at least one source select line SSL and at least one ground select line GSL.

The conductive materials 5331 to 5333 which extend in the third direction may be electrically coupled to one end of the NAND strings NS. The conductive materials 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

For example, the memory block BLKi may include a plurality of NAND strings NS which extend in a direction perpendicular to the substrate 5111 e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as ell.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
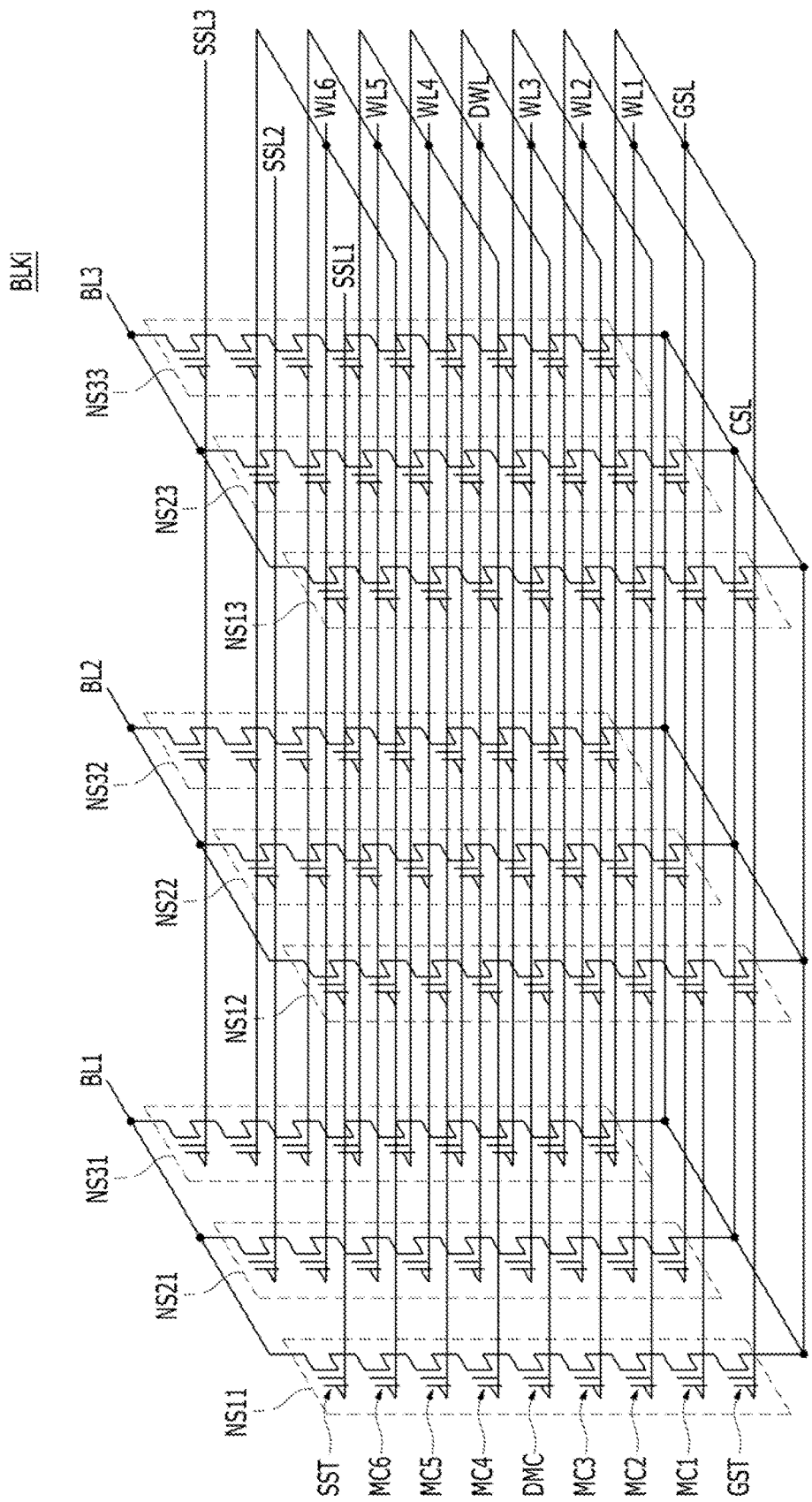

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BO and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be electrically coupled in common to upper layers through contacts. At the upper layers, the conductive materials 5211 to 5291, 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

For example, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3 the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Figure 9:
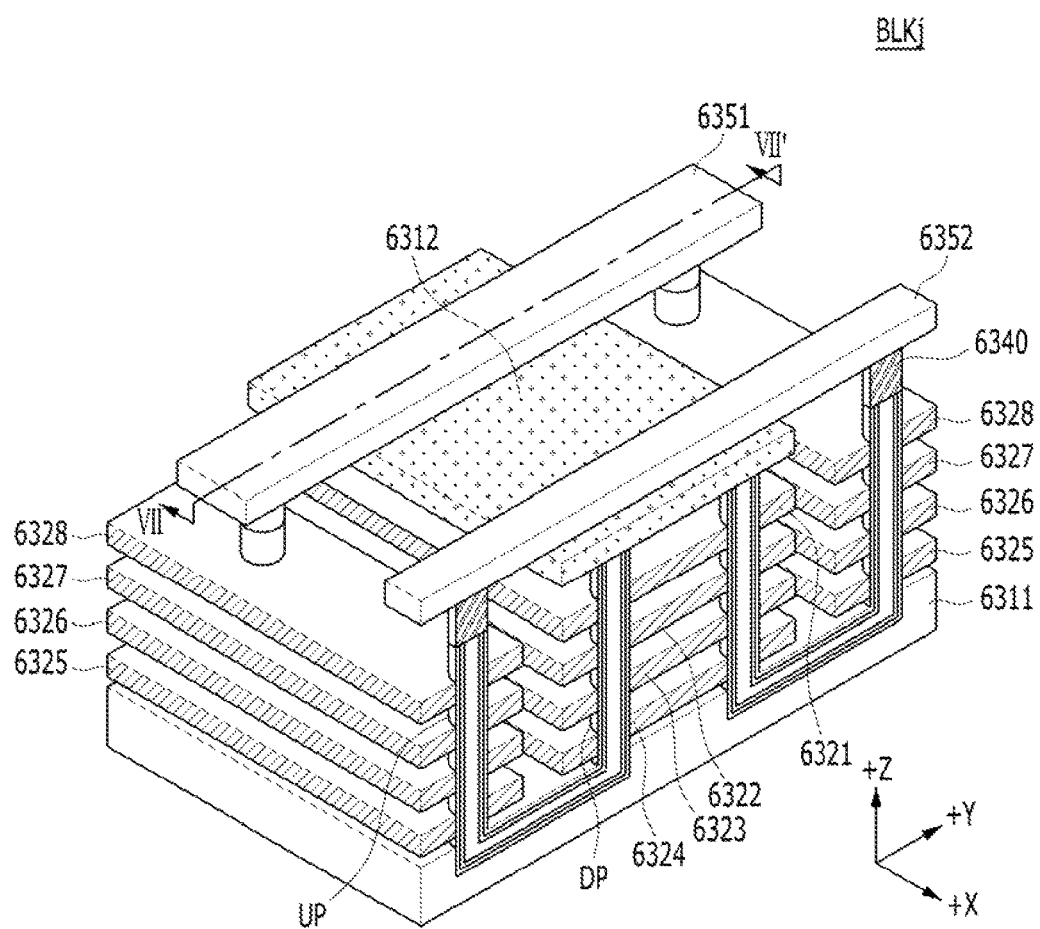
Figure 10:
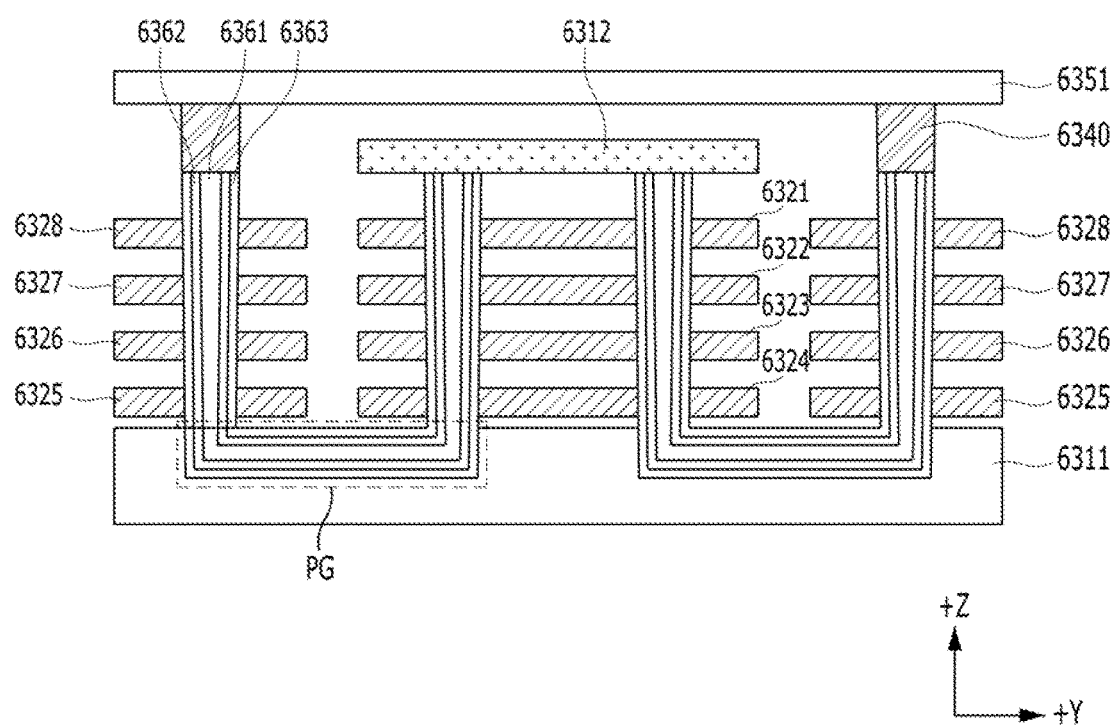
Figure 11:
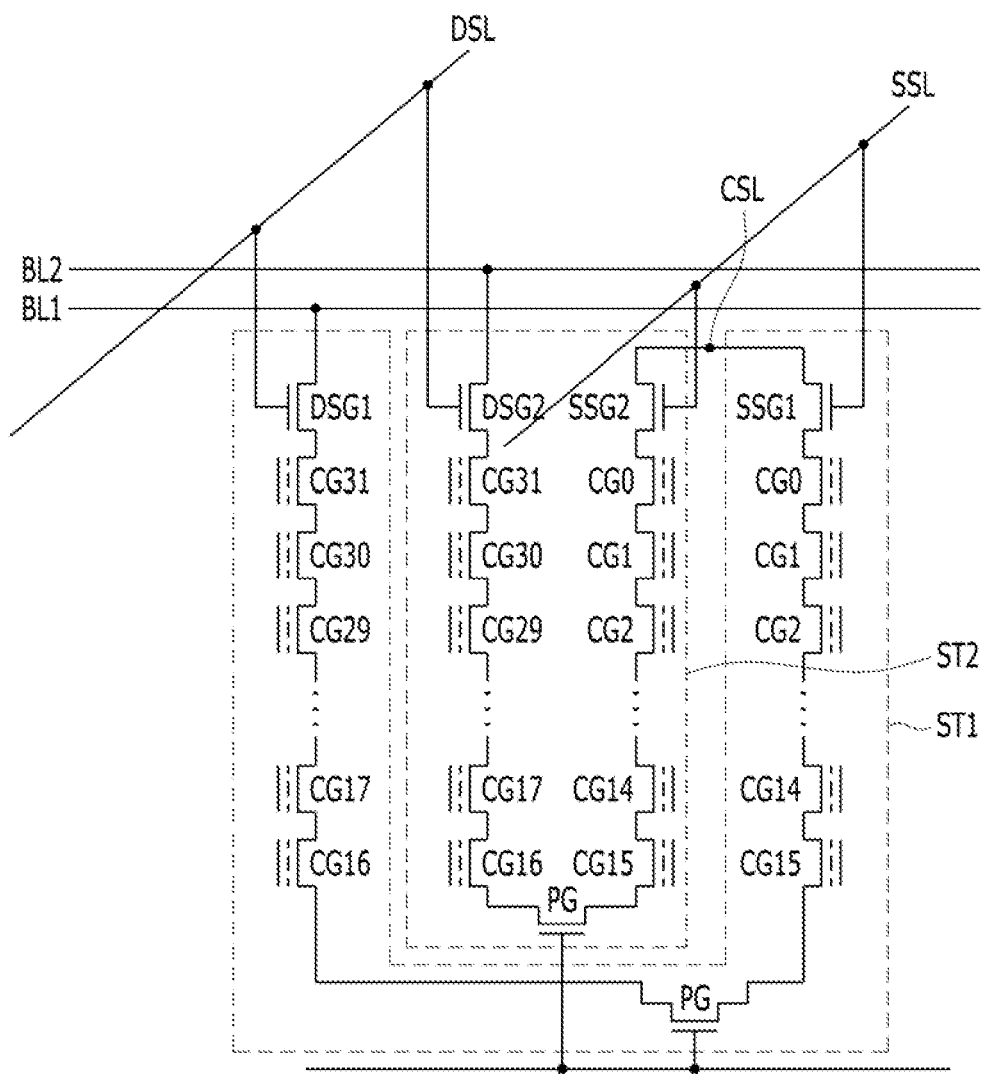

Referring now to FIGS. 9 to 11, a memory device in a memory system employing a three-dimensional (3D) nonvolatile memory device is provided, according to an embodiment of the invention.

FIG. 9 is a perspective view schematically illustrating the memory device implemented with a three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line of FIG. 9.

The memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and/or a tunneling dielectric layer.

The lower pillar DP and the upper pillar UP may be electrically coupled through a pipe gate G. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively may serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word fine DWL2, and the eighth conductive material 6328 may serve as a drain select line DSL.

The lower pillar DP and the first to fourth conductive materials 6321 to 6324 adjacent to the lower pillar DP may form a lower string. The upper pillar UP and the fifth to eighth conductive materials 6325 to 6328 adjacent to the upper pillar UP may form an upper string, The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Hereinafter, an operation of processing data for the memory device 110 in the memory system 100 according to an embodiment of the present invention during the program operation or the erase operation is described with reference to FIGS. 12 and 13.

Figure 12:
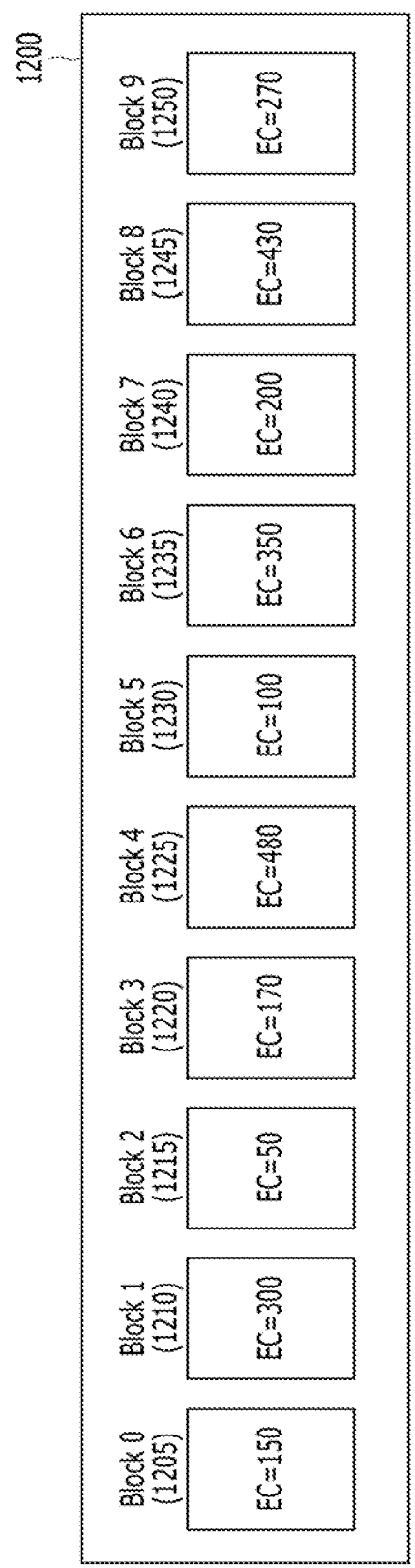
FIG. 12 is a diagram for schematically illustrating a data processing of a memory system according to an embodiment of the present invention.

FIG. 12 is a diagram for schematically describing an example of a data processing for the memory device 110 in the memory system 100 in accordance with the embodiment of the present invention.

Hereafter, for convenience of description, the program and erase operations to the memory blocks 152 to 156 of the memory device 150 in response to the program and erase commands will be described as an example of the data processing of the memory system 100.

Each of the memory blocks 152 to 156 of the memory device 150 may have a limited maximum erase count (EC) indicating the maximum number of the erase operations to a memory block. Thus, the memory block may perform the erase operation within the maximum EC. When a number of the erase operations to a memory block is greater than the maximum EC, the memory block may be processed as a bad block, which cannot be used any more. In the present embodiment, the memory system 100 may perform the wear-leveling operation to the memory blocks 152 to 156 of the memory device 150 such that the erase operation is evenly performed on entire memory blocks 152 to 156 of the memory device 150 within the maximum EC of each memory block 152 to 156. Hereafter, the wear-leveling operation based on the EC of each memory block 152 to 156 of the memory device 150 will be described in more detail.

In accordance with an embodiment of the present invention, the data processing in the memory system 100 will be illustrated as performed by the controller 130 as an example, but the data processing may be performed by the processor 134 of the controller 130, for example, through the FTL as described above.

The controller 130 may perform the program operation of programming the write data into the plurality of memory blocks. The controller 130 may perform the erase operation of erasing the programmed data of the memory blocks 152 to 156 in the memory device 150.

In accordance with an embodiment of the present invention, the controller 130 may perform the wear-leveling operation to the memory blocks 152 to 156 by swapping the programmed data among the memory blocks 152 to 156 according to the EC of each memory block 152 to 156.

In the present embodiment, the controller 130 may perform the wear-leveling operation to the memory blocks according to the EC of each memory block 152 to 156 while the controller 130 may also perform the wear-leveling operation to the memory blocks according to the program/erase (PIE) cycle or the erase/write (E/W) cycle of each memory block 152 to 156.

Referring to FIG. 12, in response to the program command with the program address, the controller 130 may program the write data to one among a plurality of memory blocks included in the memory device 1200, for example, a memory block 0 (1205), a memory block 1 (1210), a memory block 2 (1215), a memory block 3 (1220), a memory block 4 (1225), a memory block 5 (1230), a memory block 6 (1235), a memory block 7 (1240), a memory block 8 (1245), and a memory block 9 (1250). In response to the erase command with the eraser address, the controller 130 may perform the erase operation on one among the memory blocks 0 to 9 included in the memory device 1200. During the erase operation, the controller 130 may update the EC of the memory block to which the erase operation was performed. The controller 130 may manage an erase count list including entire current ECs of the memory blocks 0 to 9 and stored in the memory 144. Each time of the erase operation, the controller 130 may update current EC of each memory block 0 to 9 in the erase count list.

As described above, each of the memory blocks 0 to 9 may have the maximum EC, which is the maximum number of allowed erase operations to a corresponding memory block. The maximum EC as well as current EC of each memory block 0 to 9 may be included in the erase count list. It is assumed that the maximum ECs of the plurality of memory blocks 0 to 9 are set to 600.

During the erase operation to the memory blocks 0 to 9, the controller 130 may update the current EC of one of the memory blocks 0 to 9, to which a target of the erase operation, in the erase count list. That is, as the erase operations are performed on the memory blocks 0 to 9, the controller 130 may update the current EC in the erase count list stored in the memory 144 of the controller 130.

It is assumed that the current ECs of the memory blocks 0 to 9 are respectively 150 (EC=150), 300 (EC=300), 50 (EC=50), 170 (EC=170), 480 (EC=480), 100 (EC=100), 350 (EC=350), 200 (EC=200), 430 (EC=430), and 270 (EC=270), and the maximum ECs of the memory blocks 0 to 9 are commonly 600.

Since the current ECs of the memory blocks 0 to 9 included in the memory device 1200 are uneven, the controller 130 may perform the wear-leveling operation to the memory blocks 0 to 9 in consideration of the current ECs of the memory blocks 0 to 9. The wear-leveling operation may be performed to the memory blocks 0 to 9 such that the memory blocks 0 to 9 have even current ECs thereby maximizing the reliability and efficiency of the memory device 120.

In accordance with an embodiment of the present invention, the controller 130 may select the memory block 4 (1225) having the greatest current EC among the memory blocks 0 to 9 as a source memory block for the wear-leveling operation. In accordance with an embodiment of the present invention, the controller 130 may select a target memory block for the wear-leveling operation among remaining ones of the memory blocks 0 to 9 other than the selected source memory block (i.e., the memory block 4) in various ways. Accordingly, the controller 130 may control the source memory block and the target memory blocks to swap source data stored in the source memory block with target data stored in the target memory block during the wear-leveling operation. For example, the controller 130 may randomly select the memory block 2 (1215) as the target block, and the controller 130 may control the memory blocks 2 and 4 to swap data 4 or the source data stored in the memory block 4 (i.e. the source memory block) with data 2 or target data stored in the memory block 2 (i.e., the target memory block).

In accordance with an embodiment of the present invention, the controller 130 may manage a target memory block list including information of the remaining ones of the memory blocks 0 to 9 other than the selected source memory block. The controller 130 may select the target memory block from the target memory block list, For example, through the erase count list, the controller 1300 may select the memory block 4 (1225) having the greatest current EC as the source memory block among the memory blocks 0 to 9, and may select the target memory block from the target memory block list including information of the memory blocks 0 to 3 and 5 to 9 other than the memory block 4 or the selected source memory block.

As an example, the controller 130 may randomly select arbitrary one, for example, the memory block 2 (1215), as the target memory block from the target memory block list including information of the memory blocks 0 to 9 other than the selected source memory block.

As another example, the controller 130 may randomly select arbitrary one as the target memory block of the current wear-leveling operation among the memory blocks 0 to 9 other than both of the selected source memory block and the immediately previous target memory block of the immediately previous wear-leveling operation. As described above, the target memory block list may include information of candidates of the target memory block or the remaining ones of the memory blocks 0 to 9 other than the selected source memory block. Further, information of the previous target memory blocks are managed through a swap list including swap information of the memory blocks 0 to 9. The swap information includes information on the source and target memory blocks. The controller 130 may identify the immediately previous target memory block of the immediately previous wear-leveling operation through the swap list.

During the wear-leveling operation, the controller 130 may swap data stored in the source memory block with data stored in the target memory block, and then update the swap information in the swap list. The controller 130 may store the swap list in the memory 144 of the controller 130. For example, the swap information may include information indicating that the memory block 2 (1215) is the target memory block and the memory block 4 (1225) is the source memory block. The controller 130 may perform the erase operation to the memory blocks 2 and 4 in order to swap the data 4 stored in the memory block 4 with the data 2 stored in the memory block 2. According to the erase operation, the current ECs of the memory blocks 2 and 4 may also be updated in the erase count list.

As still another example, the controller 130 may select one in ascending order of the current EC from the smallest current EC as the target memory block from the target memory block list. For example, the controller 130 may sequentially select the memory block 2 having the current EC of 50, the memory block 5 having the current EC of 100, the memory block 0 having the current EC of 150, the memory block 3 having the current EC of 170, and the memory block 7 having the current EC of 200.

As still another example, the controller 130 may select one as the target memory block from the target memory block list by firstly selecting a group of memory blocks from the target memory block list through predetermined criteria and then selecting the one from the group of memory blocks.

As an example of the predetermined criteria, the controller 130 may randomly select arbitrary blocks as the group of memory blocks from the target memory block list. For example, the controller 130 may randomly select the memory blocks 0 to 3 as the group of memory blocks, and then select the memory block 2 as the target memory block from the group of memory blocks.

As another example of the predetermined criteria, the controller 130 may select the memory blocks each having the current EC less than an average EC EC_avg of the entire current ECs included in the erase count list as the group of memory blocks. For example, as the group of memory blocks from the target memory block list, the controller 130 may select the memory block 2 having the current EC of 50, the memory block 5 having the current EC of 100, the memory block 0 having the current EC of 150, the memory block 3 having the current EC of 170, and the memory block 7 having the current EC of 200, each of which has the current EC less than the average EC of 250 of the entire current ECs included in the erase count list.

As another example of the predetermined criteria, the controller 130 may select the memory blocks each having the current EC less than a preset EC EC_set. For example, as the group of memory blocks from the target memory block list, the controller 130 may select the memory block 2 having the current EC of 50, the memory block 5 having the current EC of 100, the memory block 0 having the current EC of 150, the memory block 3 having the current EC of 170, and the memory block 7 having the current EC of 200, each of which has the current EC less than the preset EC of 300, which corresponds to a half of the maximum EC of 600.

In this way, the controller 130 may select the group of memory blocks from the target memory block list. From the selected group of memory blocks, the controller 1300 may select the target memory block from the group of memory blocks in the same way as selecting the target memory block from the target memory block list described above. For example, from the selected group of memory blocks, the controller 1300 may randomly select arbitrary one as the target memory block, or select one in ascending order of the current EC from the smallest current EC as the target memory block.

In the embodiment of the present invention, the controller 130 may select the source and target memory blocks from the memory blocks 0 to 9 of the memory device 1200 according to the current ECs of the respective memory blocks 0 to 9. Then, the controller 130 may swap data stored in the source memory block with data stored in the target memory block through the wear-leveling operation such that erase operations to the memory blocks are evenly performed.

In the case of constantly selecting a particular memory block, for example, the memory block having the smallest EC as the target memory block for the wear-leveling operation, the erase operations may be repetitively performed on the particular memory block (i.e., the memory block having the smallest EC), which causes degradation of the reliability of the particular memory block. In the present embodiment, however, the controller 130 may randomly select the target memory block such that the erase operations are evenly performed over the entire memory blocks. Thus, the reliability of the memory blocks may be improved, and the use efficiency of the memory blocks may be maximized to stably store and process data.

Figure 13:
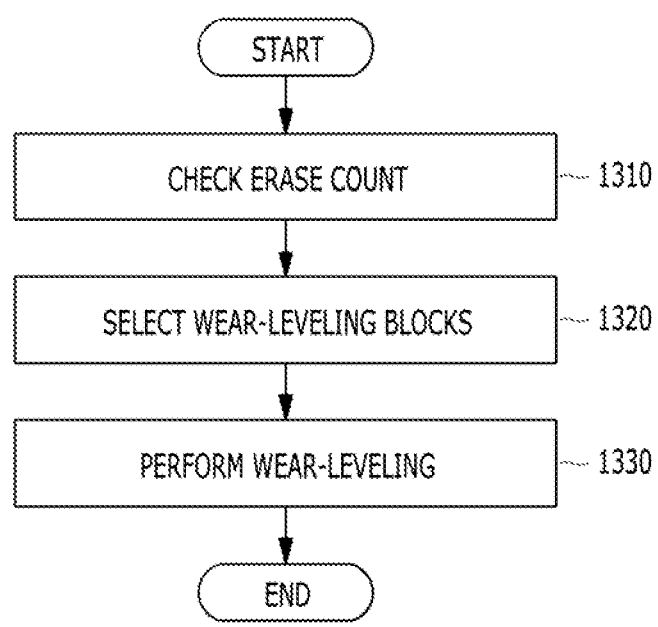
FIG. 13 is a flowchart schematically illustrating the data processing of the memory system according to the embodiment of the present invention.

FIG. 13 is a flowchart schematically illustrating the data processing of the memory system 100 in accordance with the embodiment of the present invention.

Referring to FIG. 13, the memory system 100 may check the current ECs of the respective memory blocks 0 to 9 of the memory device 1200 from the erase count list containing current EC information of the memory blocks 0 to 9 of the memory device 1200, at step 1310. At this time, the memory system 100 may check the maximum ECs of the respective memory blocks 0 to 9 of the memory device 1200.

At step 1320, according to the current ECs of the respective memory blocks 0 to 9 included in the erase count list, the memory system 100 may select the source memory block and target memory block for the wear-leveling operation from the erase count list, the target memory block list, and the swap list.

Since the current ECs of the respective memory blocks 0 to 9 of the memory device 1200 or the erase count list, and the selection of the source memory block and target memory block from the erase count list, the target memory block list, and the swap list have been described above with reference to FIG. 12, the detailed descriptions thereof are omitted herein.

At step 1330, the memory system may perform the wear-leveling operation between the source memory block and the target memory block of the memory device 1200 or may swap data stored in the source memory block with data stored in the target memory block, and may update the swap information in the swap list and the erase count list.

Since the swap between the data stored in the memory blocks according to the current ECs of the respective memory blocks 0 to 9 of the memory device 1200 or the wear-leveling operation between the source and target memory blocks, the erase count list, and the swap list have been described above with reference to FIG. 12, the detailed descriptions thereof are omitted herein.

In accordance with the embodiments of the present invention, the memory system and the operating method thereof can minimize the complexity and performance reduction of the memory system and maximize the efficiency of the memory device, thereby stably processing data.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device comprising a plurality of memory blocks, and suitable for storing data; and
   a controller suitable for performing a wear-leveling operation between source and target memory blocks selected from the memory blocks,
   wherein the controller selects the source and target memory blocks based on an erase count list storing current erase count (EC) information of the memory blocks, wherein the controller selects one having the greatest EC as the source memory block from the erase count list, wherein the controller selects the target memory block from remaining ones among the memory blocks other than both of the source memory block and an immediately previous target memory block of an immediately previous wear-leveling operation, and wherein the controller identifies the immediately previous target memory block of the immediately previous wear-leveling operation through a swap list including swap information of the memory blocks and information on the source and target memory blocks.

2. The memory system of claim 1, wherein the controller selects one in ascending order of the current EC from the smallest current EC as the target memory block among the memory blocks other than both of the source memory block and an immediately previous target memory block of an immediately previous wear-leveling operation.

3. The memory system of claim 1, wherein the controller selects one as the target memory block from the target memory block list by firstly selecting a group of memory blocks from the target memory block list through predetermined criteria and then selecting the one from the group of memory blocks.

4. The memory system of claim 3, wherein the controller selects memory blocks each having the current EC less than an average EC of the entire current ECs included in the erase count list as the group of memory blocks.

5. The memory system of claim 3, wherein the controller selects memory blocks each having the current EC less than a preset EC as the group of memory blocks.

6. The memory system of claim 3, wherein the controller selects the target memory block from the group of memory blocks other than both of the source memory block and an immediately previous target memory block of an immediately previous wear-leveling operation.

7. The memory system of claim 3, wherein the controller selects one in ascending order of the current EC from the smallest current EC as the target memory block from the group of memory blocks.

8. An operating method of a memory system comprising a plurality of memory blocks, the operating method comprising:
   selecting source and target memory blocks based on an erase count list storing current erase count (EC) information of the memory blocks; and
   performing a wear-leveling operation between the source and target memory blocks selected from the memory blocks, wherein the selecting of the source and target memory blocks includes:
   selecting one having the greatest EC as the source memory block from the erase count list, and
   selecting of the target memory block is performed by selecting the target memory block from remaining ones among the memory blocks other than both of the source memory block and an immediately previous target memory block of an immediately previous wear-leveling operation, and wherein the selecting of the target memory block identifies the immediately previous target memory block of the immediately previous wear-leveling operation through a swap list including swap information of the memory blocks and information on the source and target memory blocks.

9. The operating method of claim 8, wherein the selecting of the target memory block is performed by selecting one in ascending order of the current EC from the smallest current EC as the target memory block among the memory blocks other than both of the source memory block and an immediately previous target memory block of an immediately previous wear-leveling operation.

10. The operating method of claim 8, wherein the selecting of the target memory block is performed by selecting one as the target memory block from the target memory block list by firstly selecting a group of memory blocks from the target memory block list through predetermined criteria and then selecting the one from the group of memory blocks.

11. The operating method of claim 10, wherein the selecting of the group of memory blocks is performed by selecting memory blocks each having the current EC less than an average EC of the entire current ECs included in the erase count list as the group of memory blocks.

12. The operating method of claim 10, wherein the selecting of the group of memory blocks is performed by selecting memory blocks each having the current EC less than a preset EC as the group of memory blocks.

13. The operating method of claim 10, wherein the selecting of the target memory block is performed by selecting the target memory block from the group of memory blocks other than both of the source memory block and an immediately previous target memory block of an immediately previous wear-leveling operation.

14. The memory system of claim 10, wherein the selecting of the target memory block is performed by selecting one in ascending order of the current EC from the smallest current EC as the target memory block from the group of memory blocks.

* * * * *